(12) United States Patent
Tsai

(10) Patent No.: US 9,625,005 B2
(45) Date of Patent: Apr. 18, 2017

(54) SPEED REDUCER

(71) Applicant: DELTA ELECTRONICS, INC., Taoyuan Hsien (TW)

(72) Inventor: Ching-Hsiung Tsai, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 0 days.

(21) Appl. No.: 14/930,026

(22) Filed: Nov. 2, 2015

(65) Prior Publication Data

US 2016/0305508 A1 Oct. 20, 2016

(30) Foreign Application Priority Data

Apr. 14, 2015 (TW) .............................. 104112000 A

(51) Int. Cl.
*F16H 1/32* (2006.01)
*B60K 17/04* (2006.01)

(52) U.S. Cl.
CPC ............... *F16H 1/32* (2013.01); *B60K 17/04* (2013.01)

(58) Field of Classification Search
None
See application file for complete search history.

(56) References Cited

U.S. PATENT DOCUMENTS

| | | | | |
|---|---|---|---|---|
| RE17,811 E | * | 9/1930 | Braren | F16H 1/32 475/168 |
| 3,472,097 A | * | 10/1969 | Huska | F16H 3/60 475/168 |
| 3,723,032 A | * | 3/1973 | Woodling | F04C 2/104 418/113 |
| 3,910,733 A | * | 10/1975 | Grove | F01C 1/104 418/166 |
| 3,930,766 A | * | 1/1976 | Swedberg | F04C 2/104 418/125 |
| 3,979,167 A | * | 9/1976 | Grove | F01C 1/113 418/171 |
| 4,394,112 A | * | 7/1983 | Woodling | F01C 1/113 418/61.3 |
| 4,856,378 A | * | 8/1989 | Hvolka | F16H 25/06 475/168 |
| 5,431,605 A | * | 7/1995 | Ko | F16H 25/06 475/168 |

(Continued)

FOREIGN PATENT DOCUMENTS

JP 2006258289 A 9/2006

*Primary Examiner* — Dirk Wright
(74) *Attorney, Agent, or Firm* — Kirton McConkie; Evan R. Witt

(57) ABSTRACT

A speed reducer includes a first transmission shaft, an eccentric wheel, a first roller assembly, a rotating wheel, a second roller assembly and a second transmission shaft. The rotating wheel includes a main body and an axle hole. The main body includes a convex structure and a concave structure. The convex structure is protruded from an outer periphery of the main body and has outer teeth. The outer teeth are contacted with the corresponding first rollers. The concave structure is concavely formed in a surface of the main body and includes inner teeth. The inner teeth are contacted with plural second rollers of the second roller assembly. Since the speed reducer is designed to have four operating situations, the speed reducer can have various reduction ratios.

11 Claims, 20 Drawing Sheets

(56) References Cited

U.S. PATENT DOCUMENTS

| | | | | |
|---|---|---|---|---|
| 7,258,642 B2* | 8/2007 | Jones | ............... | F16H 25/06 |
| | | | | 475/168 |
| 7,938,748 B2* | 5/2011 | Minegishi | ............. | F03D 7/0204 |
| | | | | 475/163 |

* cited by examiner

SPEED REDUCER

FIELD OF THE INVENTION

The present invention relates to a speed reducer, and more particularly to a speed reducer with the benefits of a RV reducer and a harmonic drive reducer.

BACKGROUND OF THE INVENTION

Generally, a motor is operated at a high speed and a low torsion force. In other words, it is difficult to drive a large-sized load. Consequently, for allowing the motor to drive a heavy object, a speed reducer is used for reducing the rotating speed of the motor and increasing the torsion force.

Conventionally, the speed reducers are classified into several types, including rotary vector (RV) reducers and harmonic drive reducers. For example, the RV-E series reducer is a two-stage speed reducer produced by Nabtesco. The RV-E series reducer comprises a first speed reduction stage with a spur gear and a second speed reduction stage with an epicyclic gear. The gears of the first speed reduction stage and the second speed reduction stage are made of metallic material. The RV-E series reducer is a two-stage reduction design to reduce vibration and inertia while increasing ratio capabilities. The RV-E series reducer provides high-end performance in highly rigid and high reduction ratio configurations, and the rolling contact elements of the RV-E series reducer have high efficiency and long life. However, since the RV-E series reducer has larger volume and weight and has many components, the cost of the RV-E series reducer is high.

The harmonic drive reducer comprises a wave generator, a flex element (e.g., a flex spline) and a rigid gear. The elastic deformation of the flexible element can be controlled to result in a pushing action so as to transmit motion and power of mechanical transmission. The harmonic drive reducer has smaller size, lighter weight and higher precision when compared with the RV reducer. However, since the rigidity of the flex element of the harmonic drive reducer is lower than the metallic element, the harmonic drive reducer is unable to withstand high impact and has a problem of causing teeth difference friction. In other words, the use life of the harmonic drive reducer is shorter. Moreover, since the input speed of the harmonic drive reducer is not high, the reduction ratio of the harmonic drive reducer is lower.

Therefore, there is a need of providing a speed reducer with the characteristics of a RV reducer and a harmonic drive reducer in order to the overcome the above drawbacks.

SUMMARY OF THE INVENTION

An object of the present invention provides a speed reducer. The speed reducer comprises a rotating wheel, a first roller assembly and a second roller assembly. The rotating wheel comprises a convex structure and a concave structure. The convex structure is contacted with plural first rollers of the first roller assembly. The concave structure is contacted with plural second rollers of the second roller assembly. The cooperation of the rotating wheel and associated components can achieve the speed reducing purpose. By the speed reducer of the present invention, the problems of the conventional RV reducer (e.g., high volume, weight and cost) and the problems of the conventional harmonic drive reducer (e.g., the deformation of the flex spline and the teeth difference friction) will be overcome.

In accordance with an aspect of the present invention, there is provided a speed reducer. The speed reducer includes a first transmission shaft, an eccentric wheel, a first roller assembly, a rotating wheel, a second roller assembly and a second transmission shaft. The first transmission shaft has a first end and a second end. The eccentric wheel is eccentrically fixed on the second end of the first transmission shaft. The first roller assembly includes a first wheel disc and plural first rollers. The first wheel disc is arranged between the first end and the second end of the first roller assembly. The plural first rollers are disposed on the first wheel disc. The plural first rollers are selectively self-rotated. The rotating wheel includes a main body and an axle hole. The eccentric wheel is rotatably disposed within the axle hole. The main body includes a convex structure and a concave structure. The convex structure is protruded from an outer periphery of the main body and has one or plural outer teeth. The outer periphery of the main body is contacted with the corresponding first rollers. The concave structure is concavely formed in a surface of the main body and includes one or plural inner teeth. The second roller assembly includes a second wheel disc and plural second rollers. The plural second rollers are disposed on the second wheel disc. The plural second rollers are selectively self-rotated. The second rollers are contacted with the corresponding inner teeth. The second transmission shaft has a third end and a fourth end. The second wheel disc is fixed on the third end of the second transmission shaft. The number of the outer teeth and the number of the inner teeth are different. The number of the first rollers is at least one greater than the number of the outer teeth. The number of the second rollers is at least one greater than the number of the inner teeth.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
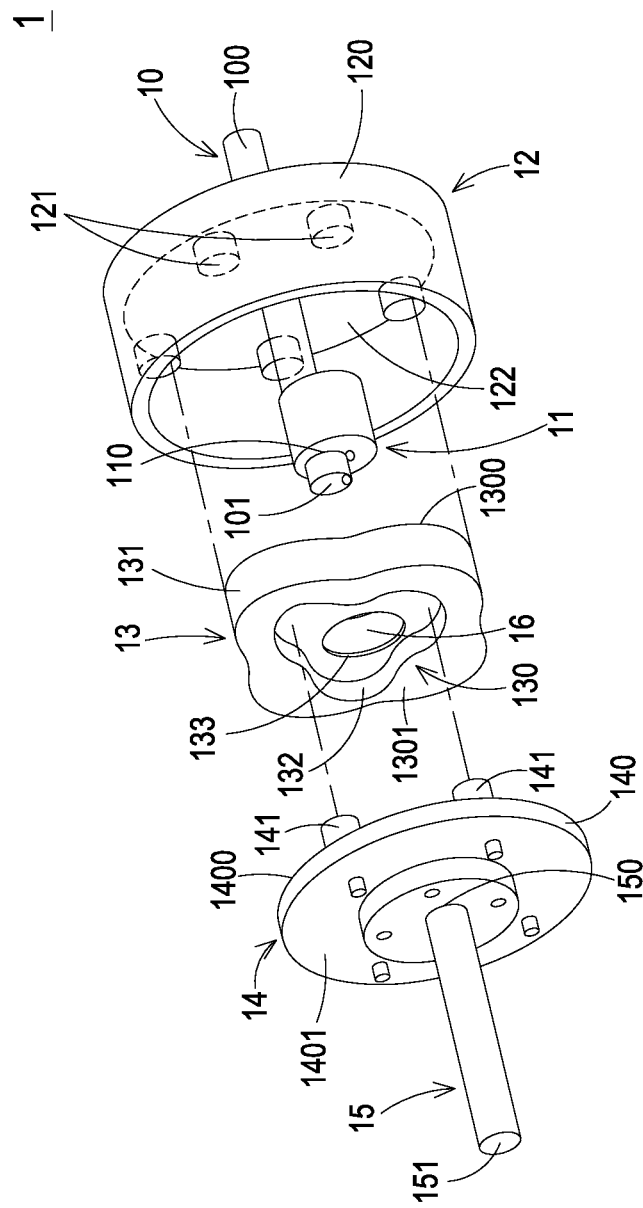
FIG. 1 is a schematic exploded view illustrating a speed reducer according to an embodiment of the present invention.

FIG. 1 is a schematic exploded view illustrating a speed reducer according to an embodiment of the present invention. The speed reducer 1 can be applied to motors, machine tools, robotic arms, automobiles, motorcycles or other motive machines in order to provide a speed reducing function. As shown in FIG. 1, the speed reducer 1 comprises a first transmission shaft 10, an eccentric wheel 11, a first roller assembly 12, a rotating wheel 13, a second roller assembly 14, a second transmission shaft 15 and a bearing 16.

Preferably but not exclusively, the first transmission shaft 10 is a shaft lever that is made of metallic material or alloy. The first transmission shaft 10 has a first end 100 and a second end 101. The first end 100 is a power input end for receiving an input power from a motor (not shown). The eccentric wheel 11 is a circular disc structure that is made of metallic material or alloy. Moreover, the eccentric wheel 11 has an eccentric hole 110. The geometric center of the eccentric hole 110 is deviated from the geometric center of the eccentric wheel 11. The second end 101 of the first transmission shaft 10 is penetrated through the eccentric hole 110. Consequently, the eccentric wheel 11 is eccentrically fixed on the second end 101 of the first transmission shaft 10. When the input power received by the first end 100 of the first transmission shaft 10 results in rotation of the first transmission shaft 10, the eccentric wheel 11 is driven by the second end 101 of the first transmission shaft 10. Consequently, the eccentric wheel 11 is eccentrically rotated relative to an axle center of the first transmission shaft 10.

The first roller assembly 12 comprises a first wheel disc 120 and plural first rollers 121. The first wheel disc 120 is a circular disc structure or a hollow cylindrical structure that is made of metallic material or alloy. Moreover, a bearing (not shown) is disposed within a center hole (not shown) of the first wheel disc 120. The central hole is at the geometric center of the first wheel disc 120. An example of the bearing includes but is not limited to a ball bearing, a needle bearing or an oil-retaining bearing. The first end 100 of the first transmission shaft 10 is penetrated through the bearing that is disposed within the center hole of first wheel disc 120. Consequently, the first end 100 and the second end 101 of the first transmission shaft 10 are located at two opposite sides of the first wheel disc 120. Preferably but not exclusively, the plural first rollers 121 are circular posts, which are made of metallic material or alloy. Moreover, the plural first rollers 121 are circumferentially and discretely arranged on a mounting surface 122 of the first wheel disc 120 at regular intervals. That is, the plural first rollers 121 and the second end 101 of the first transmission shaft 10 are located at the same side of the first wheel disc 120. Optionally, the plural first rollers 121 are rotated about their own axles (i.e., self-rotation). That is, the plural first rollers 121 can be selectively rotated about fixed positions of the mounting surface 122.

The rotating wheel 13 is made of metallic material or alloy. In this embodiment, the rotating wheel 13 comprises a main body 130 and an axle hole 133. The axle hole 133 is located at the geometric center of the main body 130. The bearing 16 is disposed within the axle hole 133. Through the bearing 16, the eccentric wheel 11 is rotatably disposed within the axle hole 133. Consequently, when the eccentric wheel 11 is rotated, the rotating wheel 13 is synchronously rotated with the eccentric wheel 11. The main body 130 comprises a first surface 1300 and a second surface 1301, wherein the first surface 1300 and the second surface 1301 are opposed to each other. Moreover, the main body 130 comprises a convex structure 131 and a concave structure 132. The first surface 1300 of the main body 130 is arranged between the plural first rollers 121 and located beside the mounting surface 122 of the first wheel disc 120. The convex structure 131 is protruded from an outer periphery of the main body 130. Moreover, the convex structure 131 comprises at least one outer tooth. In this embodiment as shown in FIG. 1, the convex structure 131 comprises plural outer teeth. Due to the plural outer teeth, the convex structure 131 has a blunt teeth profile, a wavy profile or a petal profile. Moreover, the outer peripheries of the outer teeth are contactable with the corresponding first rollers 121. The concave structure 132 is concavely formed in a middle region of the second surface 1301 of the main body 130. Moreover, the concave structure 132 comprises at least one inner tooth. In this embodiment as shown in FIG. 1, the concave structure 132 comprises plural inner teeth. Due to the plural inner teeth, the concave structure 132 has a wavy profile or a petal profile. An example of the bearing 16 includes but is not limited to a ball bearing, a needle bearing or an oil-retaining bearing. Moreover, the region between the concave structure 132 and the convex structure 131 is defined as a wall region.

The second roller assembly 14 comprises a second wheel disc 140 and plural second rollers 141. The second wheel disc 140 is a circular disc structure that is made of metallic material or alloy. The second wheel disc 140 comprises a third surface 1400 and a fourth surface 1401, wherein the third surface 1400 and the fourth surface 1401 are opposed to each other. The third surface 1400 is located beside the second surface 1301 of the rotating wheel 13. Moreover, a fixing hole (not shown) is located at a geometric center of the second wheel disc 140. Preferably but not exclusively, the plural second rollers 141 are circular posts, which are made of metallic material or alloy. The plural second rollers 141 are circumferentially and discretely arranged on the third surface 1400 of the second wheel disc 140 at regular intervals. Moreover, the plural second rollers 141 are partially accommodated within the concave structure 132 and contacted with the corresponding inner teeth of the concave structure 132 of the rotating wheel 13. Consequently, when the rotating wheel 13 is synchronously rotated with the eccentric wheel 11, the plural second rollers 141 are pushed by the corresponding inner teeth of the concave structure 132 and thus rotated. Optionally, the plural second rollers 141 are rotated about their own axles. That is, the plural second rollers 141 can be selectively rotated about fixed positions of the third surface 1400.

Preferably but not exclusively, the second transmission shaft 15 is a shaft lever that is made of metallic material or alloy. The second transmission shaft 15 has a third end 150 and a fourth end 151. The third end 150 of the second transmission shaft 15 is fixed in the fixing hole of the second wheel disc 140 of the second roller assembly 14. Consequently, when the second wheel disc 140 of the second roller assembly 14 is rotated, the second transmission shaft 15 is synchronously rotated with the second wheel disc 140. Moreover, the fourth end 151 of the second transmission shaft 15 is a power output end.

Figure 2:
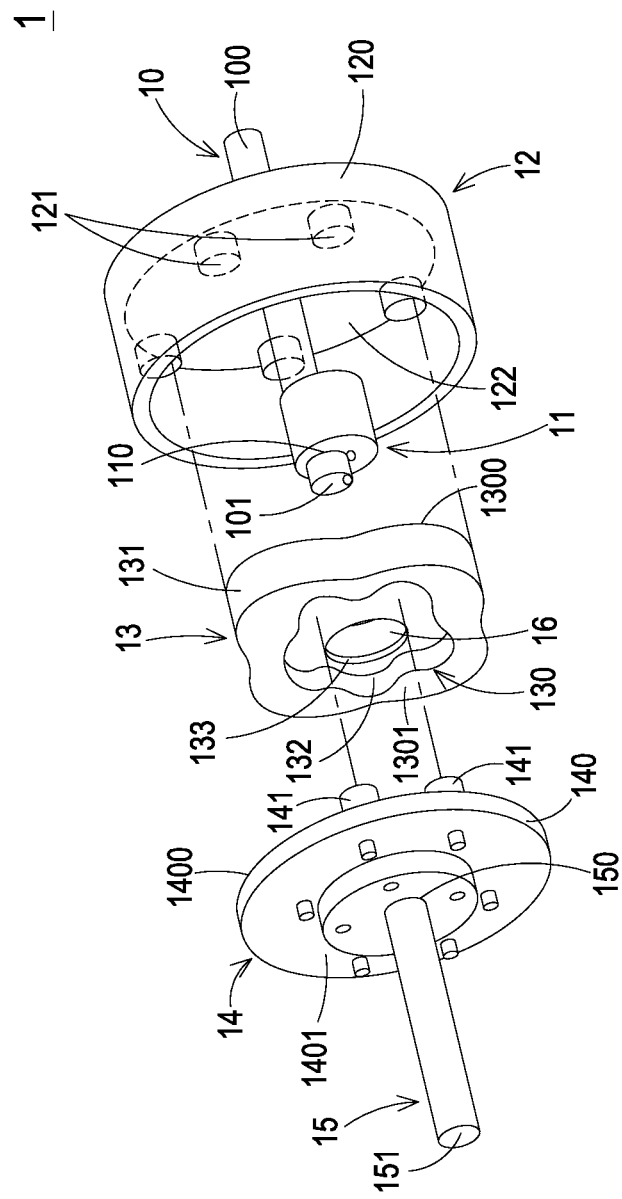
FIG. 2 is a schematic exploded view illustrating a speed reducer according to another embodiment of the present invention.

In this embodiment, the number of the first rollers 121 is at least one more than the number of the outer teeth of the convex structure 131 of the rotating wheel 13, and the number of the second rollers 141 is more than the number of the inner teeth of the concave structure 132 of the rotating wheel 13. In case that the plural first rollers 121 are rotated about the fixed positions of the mounting surface 122, the plural second rollers 141 are not rotated about the fixed positions of the third surface 1400 of the second wheel disc 140. Whereas, in case that the plural second rollers 141 are rotated about the fixed positions of the third surface 1400 of the second wheel disc 140, the plural first rollers 121 are not rotated about the fixed positions of the mounting surface 122. Moreover, the number of the outer teeth of the convex structure 131 and the number of the inner teeth of the concave structure 132 are different. In the embodiment of FIG. 1, the number of the outer teeth of the convex structure 131 is at least one more than the number of the inner teeth of the concave structure 132. Alternatively, in another embodiment, the number of the inner teeth of the concave structure 132 is at least one more than the number of the outer teeth of the convex structure 131. For example, as shown in FIG. 2, the number of the outer teeth of the convex structure 131 is four, and the number of the inner teeth of the concave structure 132 is five.

Since the reduction ratio of the speed reducer 1 is determined according to the difference between the number of the outer teeth and the number of the inner teeth and the self-rotation of plural first rollers 121 or the plural second rollers 141. According to the above designing concepts, the speed reducer 1 can be designed to have four operating situations. For understanding the present invention, the following presuppositions are made: (a) the number difference between the number of the outer teeth of the convex structure 131 and the number of the inner teeth of the concave structure 132 is one, (b) the number of the first rollers 121 is at least one more than the number of the outer teeth of the convex structure 131 of the rotating wheel 13, and (c) the number of the second rollers 141 is at least one more than the number of the inner teeth of the concave structure 132 of the rotating wheel 13. In the following drawings, the dotted circles indicate that the first rollers 121 or the second rollers 141 are not self-rotated, and the solid circles indicate that the first rollers 121 or the second rollers 141 are self-rotated.

In the first operating situation of the speed reducer 1, the number of the outer teeth of the convex structure 131 is one more than the number of the inner teeth of the concave structure 132, the plural first rollers 121 are not rotated about the fixed positions of the mounting surface 122, and the plural second rollers 141 are rotated about the fixed positions of the third surface 1400 of the second wheel disc 140. For example, in case that the number of the outer teeth of the convex structure 131 is N, the number of the inner teeth of the concave structure 132 is equal to (N−1), the number of the first rollers 121 is equal to (N+1), and the number of the second rollers 141 is equal to N. In the first operating situation, the rotating direction of the first transmission shaft 10 and the rotating direction of the second transmission shaft 15 are identical. Moreover, the reduction ratio of the speed reducer 1 is equal to N×N, wherein N is an integer greater than 1.

Figure 3:
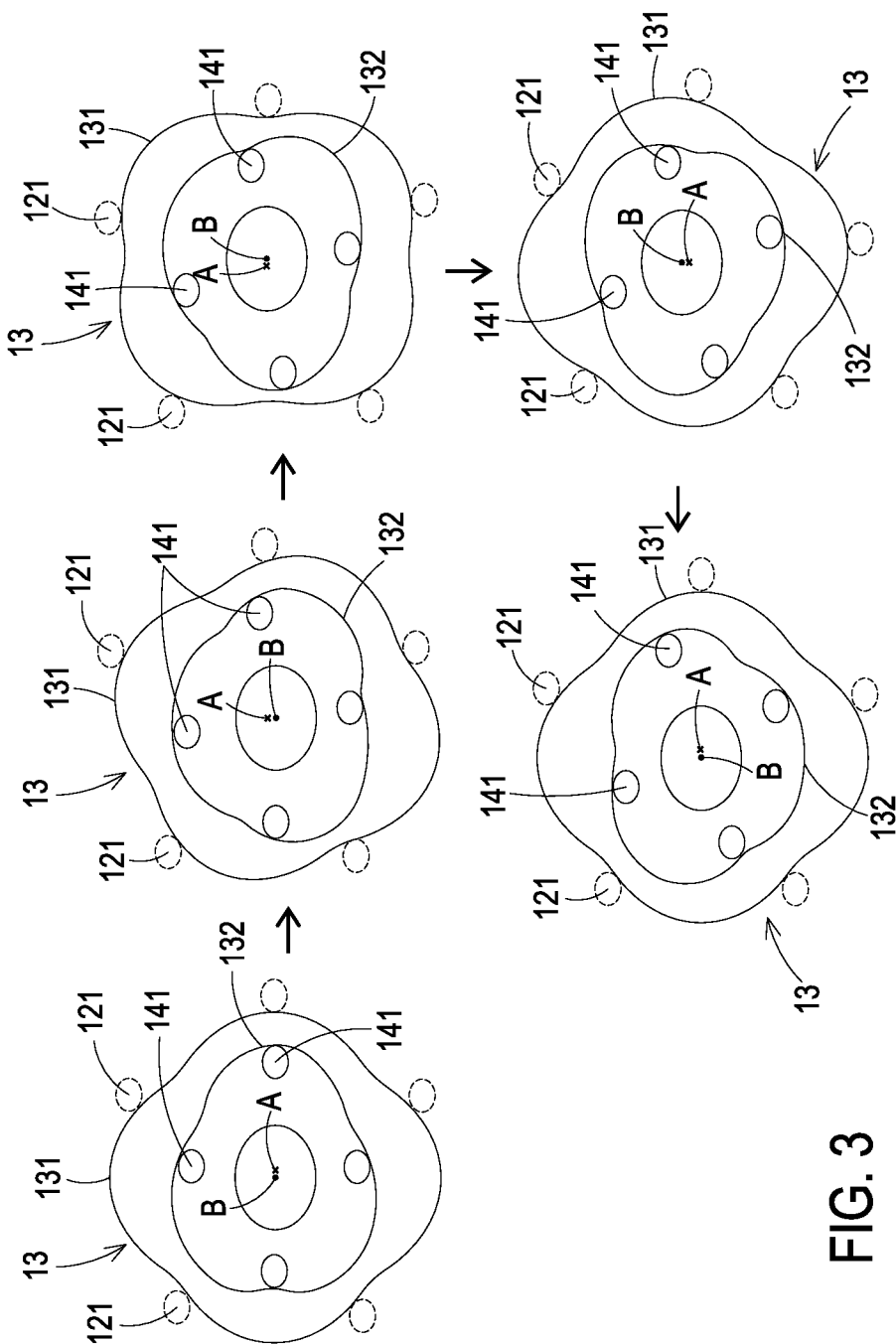
FIG. 3 schematically illustrates the sequential actions of the speed reducer of the present invention in the first operating situation.

Hereinafter, the operating principles of the speed reducer 1 in the first operating situation will be illustrated with reference to FIGS. 3-7. FIG. 3 schematically illustrates the sequential actions of the speed reducer of the present invention in the first operating situation. For example, the number of the outer teeth of the convex structure 131 is 4, and the number of the inner teeth of the concave structure 132 is 3. In FIG. 3, the time interval between every two adjacent actions is equal to the time period of rotating one-fourth turn of the first transmission shaft 10. When the first transmission shaft 10 is driven by an external driving mechanism (e.g., the shaft lever of the motor) and rotated in a counterclockwise direction, the eccentric wheel 11 is synchronously rotated with the first transmission shaft 10 in the counterclockwise direction. In FIG. 3 and the following drawings, the symbol A denotes the axle center of the first transmission shaft 10, and the symbol B denotes the axle center of the eccentric wheel 11. When the first transmission shaft 10 is rotated one turn, the eccentric wheel 11 is eccentrically rotated one turn. Since the eccentric wheel 11 is rotatably disposed within the bearing 16, the eccentric rotation of the eccentric wheel 11 will result in a pushing force to push the rotating wheel 13 to be slowly rotated in a clockwise direction. Moreover, since the plural first rollers 121 are not rotated about the fixed positions of the mounting surface 122, the inner teeth of the concave structure 132 and the plural second rollers 141 of the second roller assembly 14 are pushed against each other. Under this circumstance, the plural second rollers 141 are self-rotated in the clockwise direction and rotated about the common axis in the counterclockwise direction so as to result in an epicyclic motion. In response to the epicyclic motion of the plural second rollers 141, the second wheel disc 140 is correspondingly rotated in the counterclockwise direction. Consequently, the second transmission shaft 15 is synchronously rotated with the second wheel disc 140 in the counterclockwise direction. As the second transmission shaft 15 is rotated, an external driven mechanism (e.g., a belt pulley or a gear) is driven to be rotated at a reduced speed. In this embodiment, the number of the outer teeth of the convex structure 131 is 4, and the number of the inner teeth of the concave structure 132 is 3. In response to one-fourth turn of the first transmission shaft 10 in the counterclockwise direction, the epicyclic motion of the plural second rollers 141 results in one-sixteenth turn of the second transmission shaft 15. Consequently, the reduction ratio of the speed reducer 1 is 16.

Figure 4:
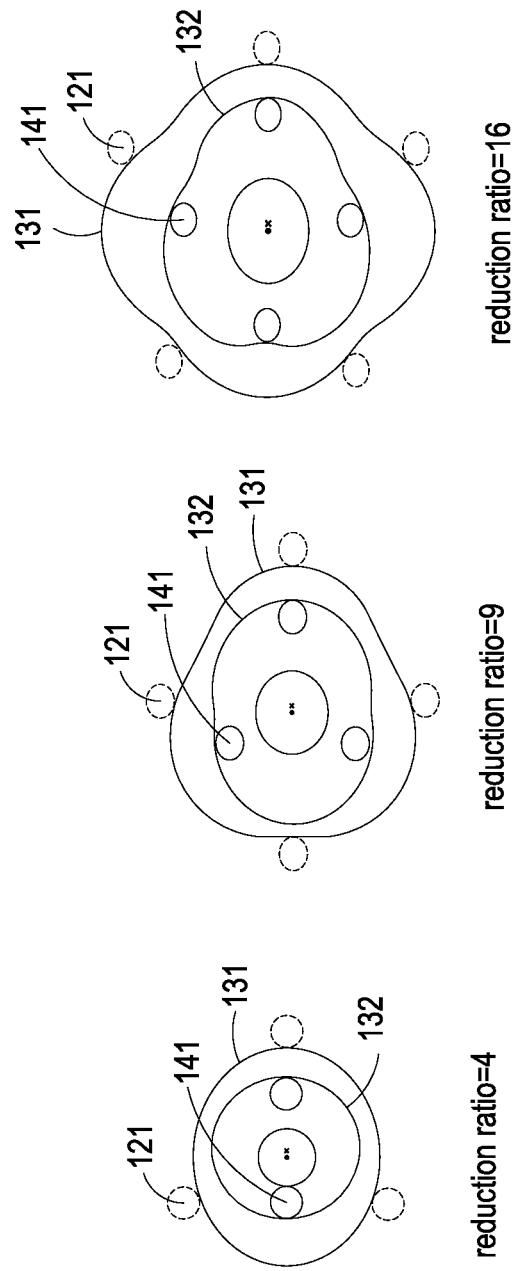
FIG. 4 schematically illustrates three examples of the speed reducer of the present invention in the first operating situation, in which the numbers of the outer teeth of the convex structure are 2, 3 and 4, respectively.
Figure 5:
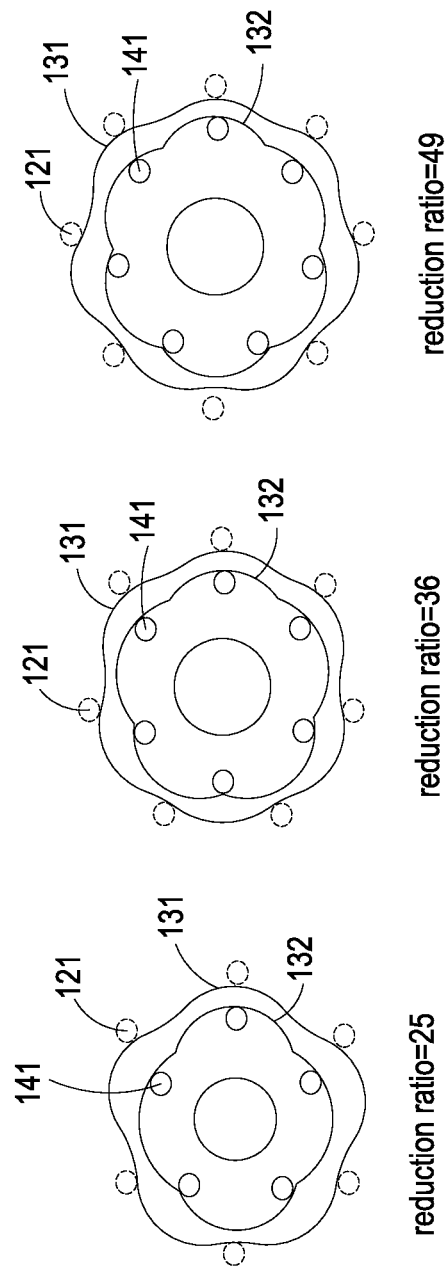
FIG. 5 schematically illustrates three examples of the speed reducer of the present invention in the first operating situation, in which the numbers of the outer teeth of the convex structure are 5, 6 and 7, respectively.
Figure 6:
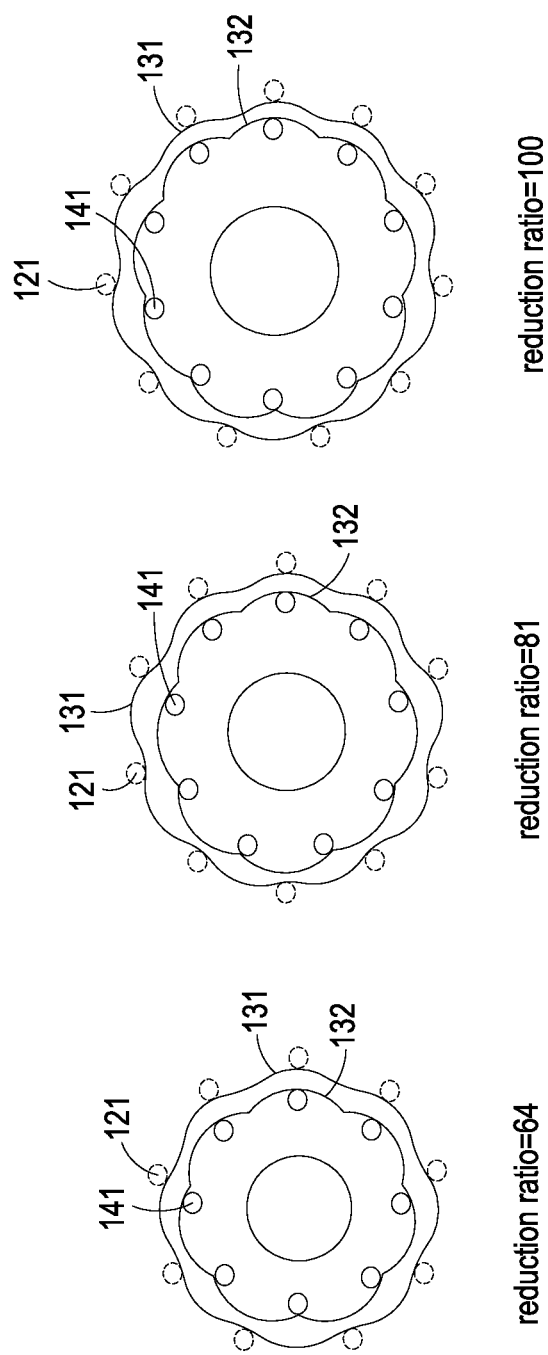
FIG. 6 schematically illustrates three examples of the speed reducer of the present invention in the first operating situation, in which the numbers of the outer teeth of the convex structure are 8, 9 and 10, respectively.
Figure 7:
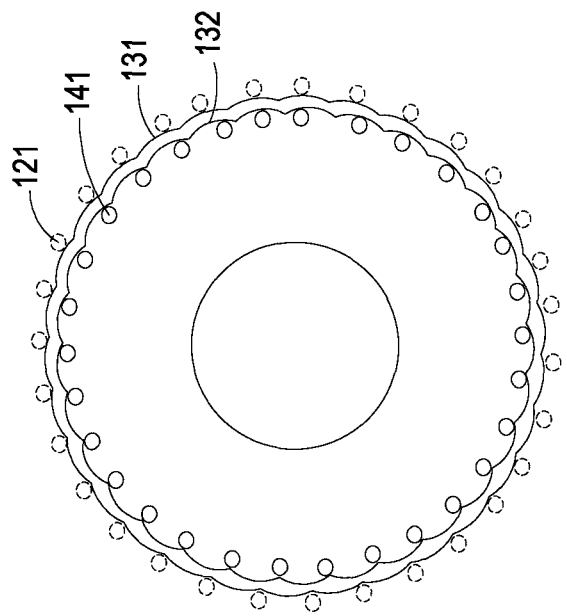
FIG. 7 schematically illustrates two examples of the speed reducer of the present invention in the first operating situation, in which the numbers of the outer teeth of the convex structure are 20 and 30, respectively.
Figure 7:
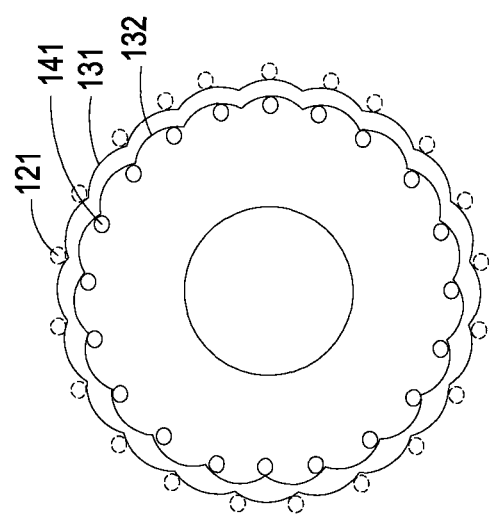

In the first operating situation, if the number of the outer teeth of the convex structure 131 is N, the reduction ratio of the speed reducer 1 is equal to N×N. FIG. 4 schematically illustrates three examples of the speed reducer of the present invention in the first operating situation, in which the numbers of the outer teeth of the convex structure are 2, 3 and 4, respectively. If the number of the outer teeth is 2 and the number of the inner teeth is 1, the reduction ratio of the speed reducer 1 is equal to 4 (i.e., 2×2=4). If the number of the outer teeth is 3 and the number of the inner teeth is 2, the reduction ratio of the speed reducer 1 is equal to 9 (i.e., 3×3=9). If the number of the outer teeth is 4 and the number of the inner teeth is 3, the reduction ratio of the speed reducer 1 is equal to 16 (i.e., 4×4=16). FIG. 5 schematically illustrates three examples of the speed reducer of the present invention in the first operating situation, in which the numbers of the outer teeth of the convex structure are 5, 6 and 7, respectively. If the number of the outer teeth is 5 and the number of the inner teeth is 4, the reduction ratio of the speed reducer 1 is equal to 25 (i.e., 5×5=25). If the number of the outer teeth is 6 and the number of the inner teeth is 5, the reduction ratio of the speed reducer 1 is equal to 36 (i.e., 6×6=36). If the number of the outer teeth is 7 and the number of the inner teeth is 6, the reduction ratio of the speed reducer 1 is equal to 25 (i.e., 7×7=49). FIG. 6 schematically illustrates three examples of the speed reducer of the present invention in the first operating situation, in which the numbers of the outer teeth of the convex structure are 8, 9 and 10, respectively. If the number of the outer teeth is 8 and the number of the inner teeth is 7, the reduction ratio of the speed reducer 1 is equal to 64 (i.e., 8×8=64). If the number of the outer teeth is 9 and the number of the inner teeth is 8, the reduction ratio of the speed reducer 1 is equal to 81 (i.e., 9×9=81). If the number of the outer teeth is 10 and the number of the inner teeth is 9, the reduction ratio of the speed reducer 1 is equal to 100 (i.e., 10×10=100). FIG. 7 schematically illustrates two examples of the speed reducer of the present invention in the first operating situation, in which the numbers of the outer teeth of the convex structure are 20 and 30, respectively. If the number of the outer teeth is 20 and the number of the inner teeth is 19, the reduction ratio of the speed reducer 1 is equal to 400 (i.e., 20×20=400). If the number of the outer teeth is 30 and the number of the inner teeth is 29, the reduction ratio of the speed reducer 1 is equal to 900 (i.e., 30×30=900).

From the above descriptions, the pushing action of the speed reducer 1 of the present invention is similar to the conventional harmonic drive reducer. Consequently, in comparison with the RV reducer, the speed reducer 1 of the present invention has simplified structure and less number of components, and is easily assembled and cost-effective. Moreover, for achieving a high reduction ratio (e.g., 900), the gap between every two adjacent teeth of the gear of the conventional harmonic drive reducer is very small. Consequently, it is difficult to produce the conventional harmonic drive reducer with high reduction ratio. In other words, the reduction ratio cannot be largely increased. In contrast, if the number of the outer teeth of the convex structure 131 is 30 and the number of the inner teeth of the concave structure 132 is 29, the speed reducer 1 of the present invention can achieve the reduction ratio of 900. Moreover, the rotating wheel 13 can be easily produced, and the reduction ratio of the speed reducer 1 is largely increased. Moreover, due to the wall region between the concave structure 132 and the convex structure 131 of the rotating wheel 13 of the speed reducer 1, the overall rigidity of the speed reducer 1 is increased to withstand high impact and the use life of the speed reducer 1 is prolonged. Consequently, the problems of the conventional harmonic drive reducer (e.g., the deformation of the flex spline and the teeth difference friction).

Figure 8:
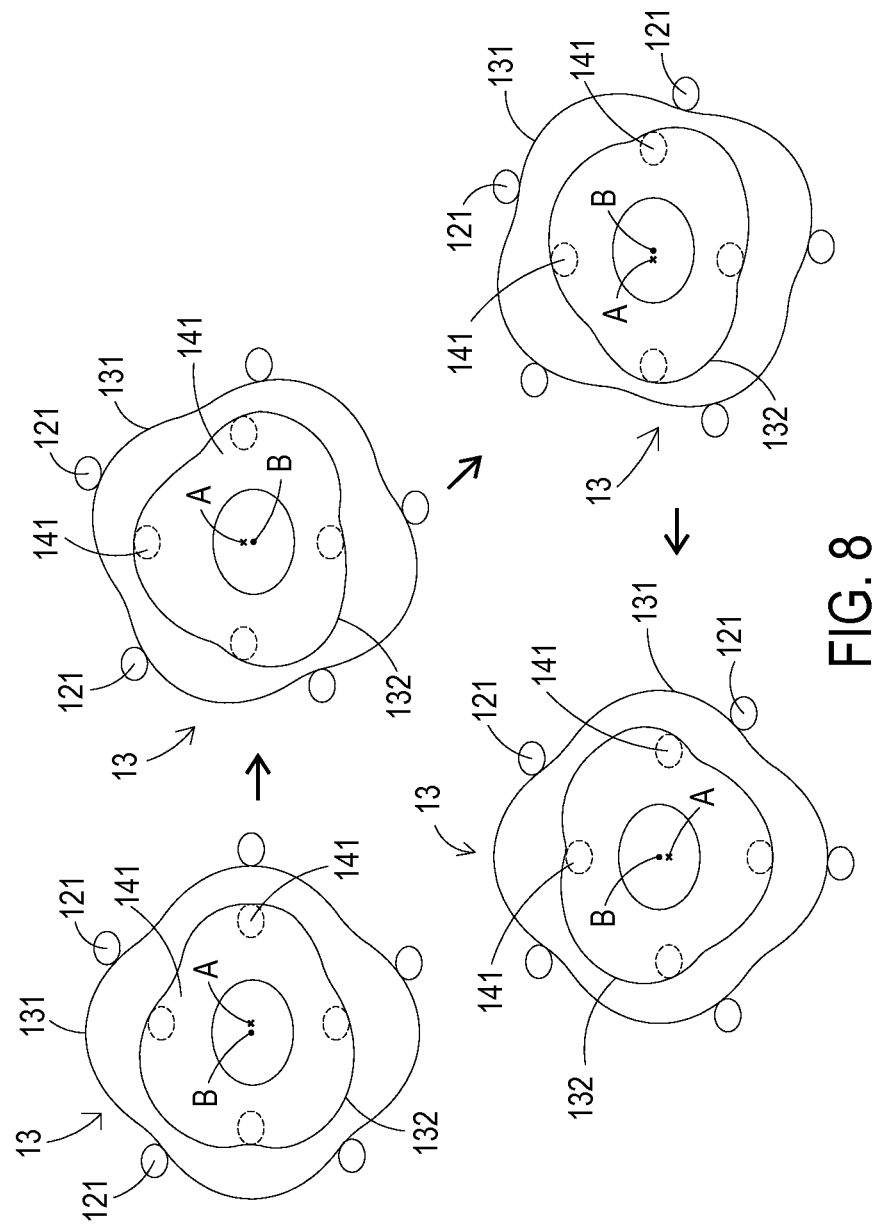
FIG. 8 schematically illustrates the sequential actions of the speed reducer of the present invention in the second operating situation.

In the second operating situation of the speed reducer 1, the number of the outer teeth of the convex structure 131 is at least one more than the number of the inner teeth of the concave structure 132, the plural first rollers 121 are rotated about the fixed positions of the mounting surface 122, and the plural second rollers 141 are not rotated about the fixed positions of the third surface 1400 of the second wheel disc 140. For example, in case that the number of the outer teeth of the convex structure 131 is N, the number of the inner teeth of the concave structure 132 is equal to (N−1), the number of the first rollers 121 is equal to (N+1), and the number of the second rollers 141 is equal to N. In the second operating situation, the rotating direction of the first transmission shaft 10 and the rotating direction of the second transmission shaft 15 are different. Moreover, the reduction ratio of the speed reducer 1 is equal to (N+1)×(N−1), wherein N is an integer greater than 1. FIG. 8 schematically illustrates the sequential actions of the speed reducer of the present invention in the second operating situation. For example, the number of the outer teeth of the convex structure 131 is 4, and the number of the inner teeth of the concave structure 132 is 3. In FIG. 8, the time interval between every two adjacent actions is equal to the time period of rotating one-fourth turn of the first transmission shaft 10. Under this circumstance, the reduction ratio of the speed reducer 1 is (4+1)×(4−1)=15.

Figure 9:
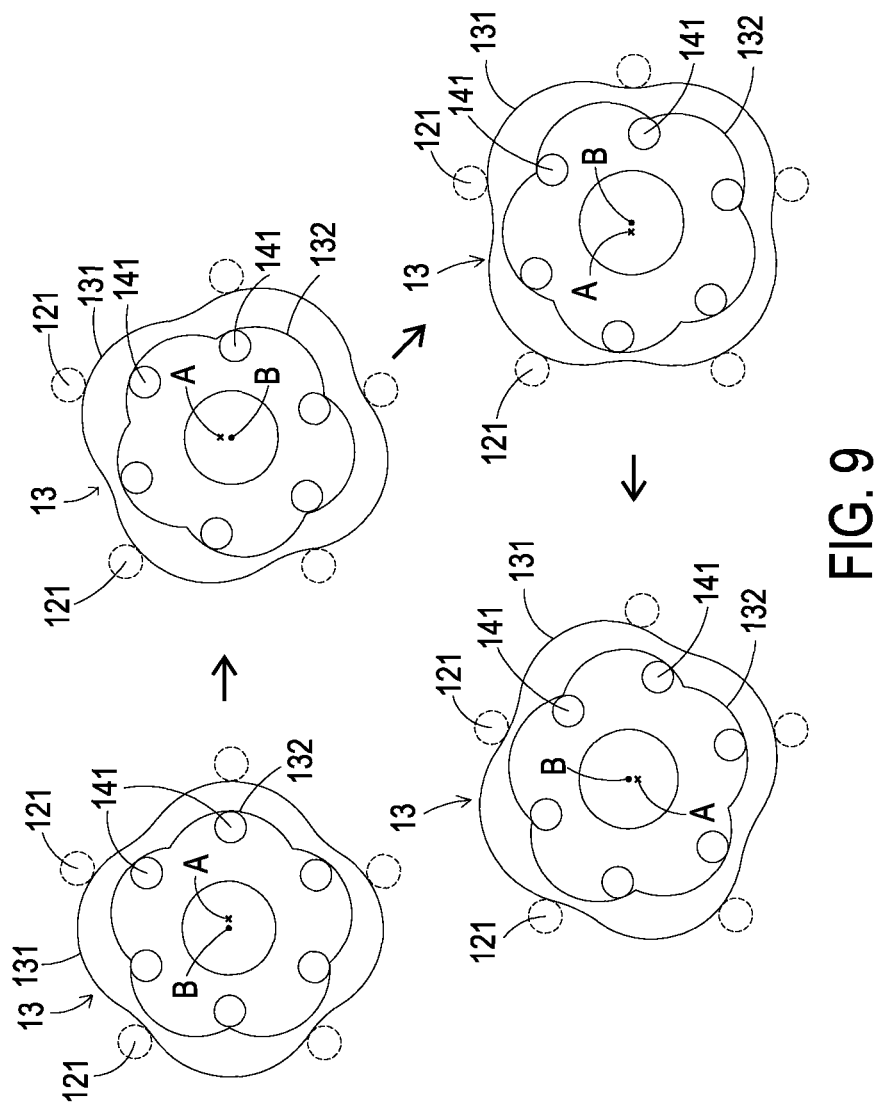
FIG. 9 schematically illustrates the sequential actions of the speed reducer of the present invention in the third operating situation.

In the third operating situation of the speed reducer 1, the number of the inner teeth of the concave structure 132 is at least one more than the number of the outer teeth of the convex structure 131, the plural first rollers 121 are not rotated about the fixed positions of the mounting surface 122, and the plural second rollers 141 are rotated about the fixed positions of the third surface 1400 of the second wheel disc 140. For example, in case that the number of the outer teeth of the convex structure 131 is N, the number of the inner teeth of the concave structure 132 is equal to (N+1), the number of the first rollers 121 is equal to (N+1), and the number of the second rollers 141 is equal to (N+2). In the third operating situation, the rotating direction of the first transmission shaft 10 and the rotating direction of the second transmission shaft 15 are different. Moreover, the reduction ratio of the speed reducer 1 is equal to N×(N+2), wherein N is an integer greater than 1. FIG. 9 schematically illustrates the sequential actions of the speed reducer of the present invention in the third operating situation. For example, the number of the outer teeth of the convex structure 131 is 4, and the number of the inner teeth of the concave structure 132 is 5. In FIG. 9, the time interval between every two adjacent actions is equal to the time period of rotating one-fourth turn of the first transmission shaft 10. Under this circumstance, the reduction ratio of the speed reducer 1 is 4×(4+2)=24.

Figure 10:
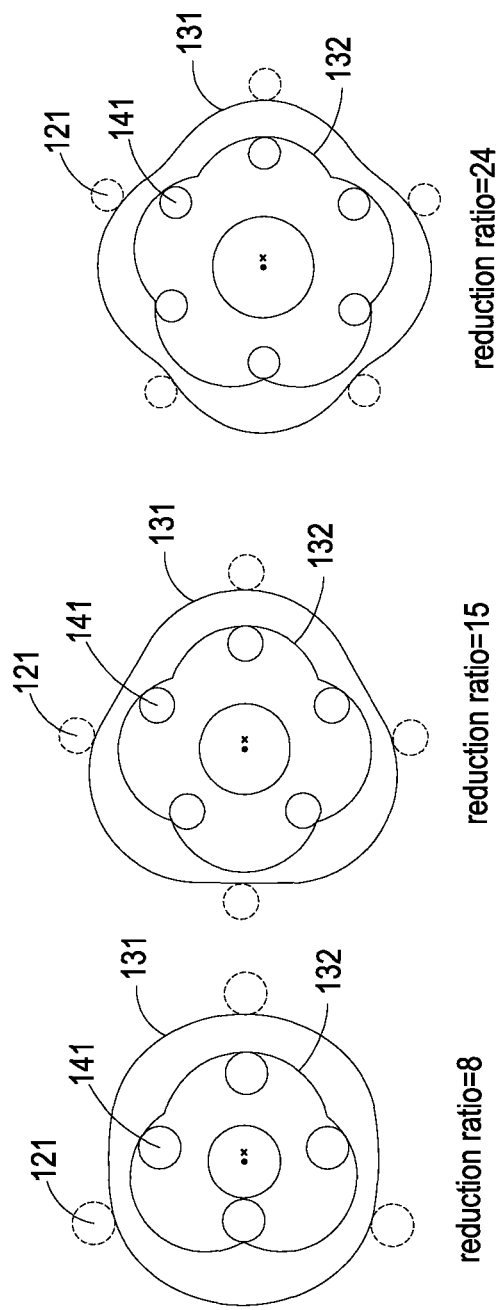
FIG. 10 schematically illustrates three examples of the speed reducer of the present invention in the third operating situation, in which the numbers of the outer teeth of the convex structure are 2, 3 and 4, respectively.
Figure 11:
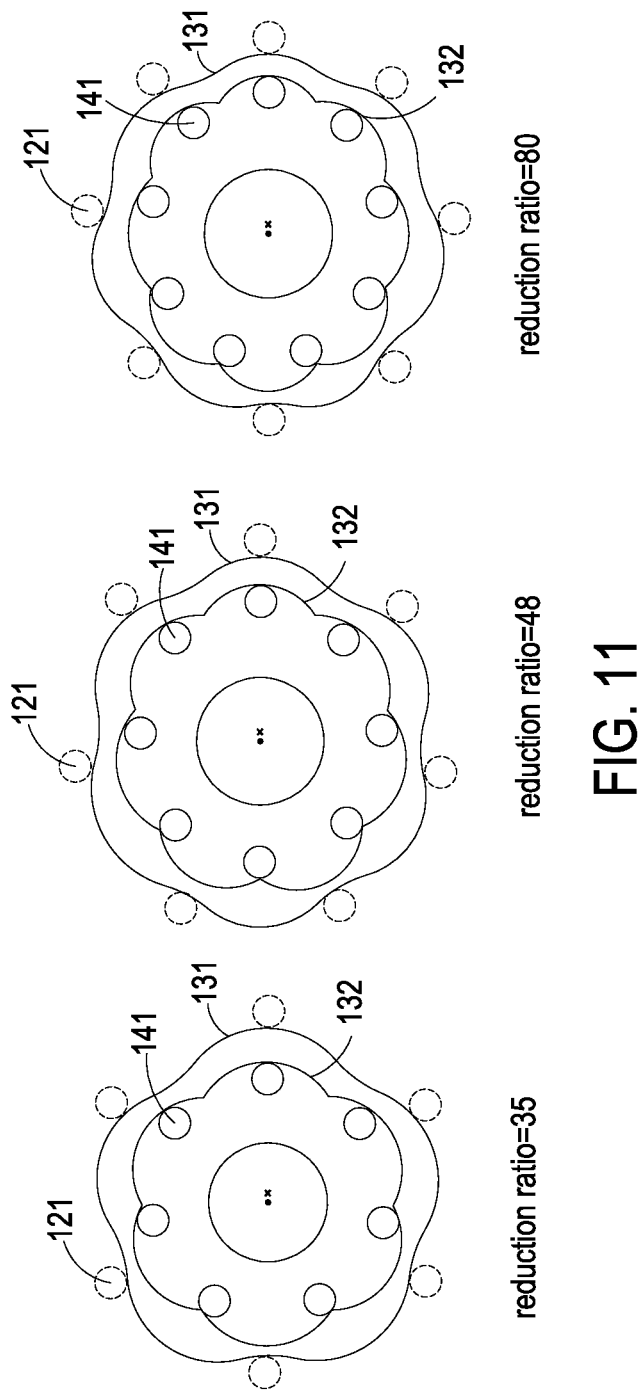
FIG. 11 schematically illustrates three examples of the speed reducer of the present invention in the third operating situation, in which the numbers of the outer teeth of the convex structure are 5, 6 and 8, respectively.

In the third operating situation, if the number of the outer teeth of the convex structure 131 is N, the reduction ratio of the speed reducer 1 is equal to N×(N+2). FIG. 10 schematically illustrates three examples of the speed reducer of the present invention in the third operating situation, in which the numbers of the outer teeth of the convex structure are 2, 3 and 4, respectively. For example, if the number of the outer teeth is 2 and the number of the inner teeth is 3, the reduction ratio of the speed reducer 1 is equal to 8 (i.e., 2×4=8). If the number of the outer teeth is 3 and the number of the inner teeth is 4, the reduction ratio of the speed reducer 1 is equal to 15 (i.e., 3×5=15). If the number of the outer teeth is 4 and the number of the inner teeth is 5, the reduction ratio of the speed reducer 1 is equal to 24 (i.e., 4×6=24). FIG. 11 schematically illustrates three examples of the speed reducer of the present invention in the third operating situation, in which the numbers of the outer teeth of the convex structure are 5, 6 and 8, respectively. If the number of the outer teeth is 5 and the number of the inner teeth is 6, the reduction ratio of the speed reducer 1 is equal to 35 (i.e., 5×7=35). If the number of the outer teeth is 6 and the number of the inner teeth is 7, the reduction ratio of the speed reducer 1 is equal to 35 (i.e., 6×8=48). If the number of the outer teeth is 8 and the number of the inner teeth is 9, the reduction ratio of the speed reducer 1 is equal to 80 (i.e., 8×10=80).

Figure 12:
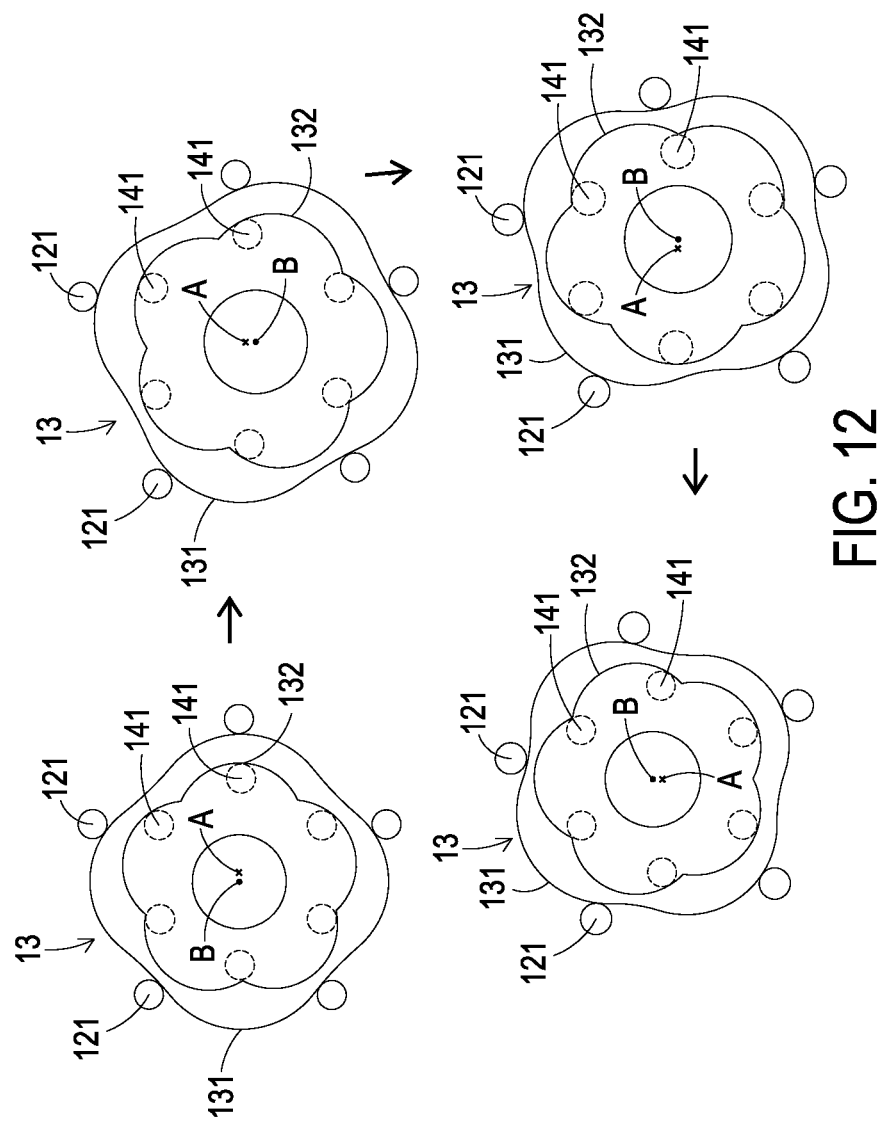
FIG. 12 schematically illustrates the sequential actions of the speed reducer of the present invention in the fourth operating situation.

In the fourth operating situation of the speed reducer 1, the number of the inner teeth of the concave structure 132 is at least one more than the number of the outer teeth of the convex structure 131, the plural first rollers 121 are rotated about the fixed positions of the mounting surface 122, and the plural second rollers 141 are not rotated about the fixed positions of the third surface 1400 of the second wheel disc 140. For example, in case that the number of the outer teeth of the convex structure 131 is N, the number of the inner teeth of the concave structure 132 is equal to (N+1), the number of the first rollers 121 is equal to (N+1), and the number of the second rollers 141 is equal to (N+2). In the fourth operating situation, the rotating direction of the first transmission shaft 10 and the rotating direction of the second transmission shaft 15 are identical. Moreover, the reduction ratio of the speed reducer 1 is equal to (N+1)×(N+1), wherein N is an integer greater than 1. FIG. 12 schematically illustrates the sequential actions of the speed reducer of the present invention in the fourth operating situation. For example, the number of the outer teeth of the convex structure 131 is 4, and the number of the inner teeth of the concave structure 132 is 5. In FIG. 12, the time interval between every two adjacent actions is equal to the time period of rotating one-fourth turn of the first transmission shaft 10. Under this circumstance, the reduction ratio of the speed reducer 1 is (4+1)×(4+1)=25.

As mentioned above, the number difference between the number of the outer teeth of the convex structure 131 and the number of the inner teeth of the concave structure 132 is one. The parameters of the speed reducer 1 in the four operating situations are listed in the following table.

|  | Situation 1 | Situation 2 | Situation 3 | Situation 4 |
|---|---|---|---|---|
| Number of outer teeth | N | N | N | N |
| Number of inner teeth | N − 1 | N − 1 | N + 1 | N + 1 |
| Number of first rollers | N + 1 | N + 1 (self-rotation) | N + 1 (self-rotation) | N + 1 |
| Number of second rollers | N (self-rotation) | N | N + 2 (self-rotation) | N + 2 |
| Reduction ratio | N × N | (N + 1) × (N − 1) | N × (N + 2) | (N + 1) × (N + 1) |
| Rotating directions of first and second transmission shafts | Identical | Different | Different | Identical |

It is noted that the number difference between the number of the outer teeth of the convex structure 131 and the number of the inner teeth of the concave structure 132 may be more than one. Regardless of the number difference, the speed reducer 1 can be designed to have the above four operating situations. Consequently, the speed reducer 1 can have various reduction ratios.

In the first operating situation of the speed reducer 1, the following presuppositions are made: the plural first rollers 121 are not rotated about the fixed positions of the mounting surface 122, the plural second rollers 141 are rotated about the fixed positions of the third surface 1400 of the second wheel disc 140, and the number of the outer teeth of the convex structure 131 minus the number of the inner teeth of the concave structure 132 is K. Under this circumstance, the rotating direction of the first transmission shaft 10 and the rotating direction of the second transmission shaft 15 are identical. In case that the number of the outer teeth of the convex structure 131 is N, the reduction ratio is equal to |N×(N−K+1)/K|, wherein N is an integer greater than 1 and the difference (N−K) is greater than 1.

Figure 13:
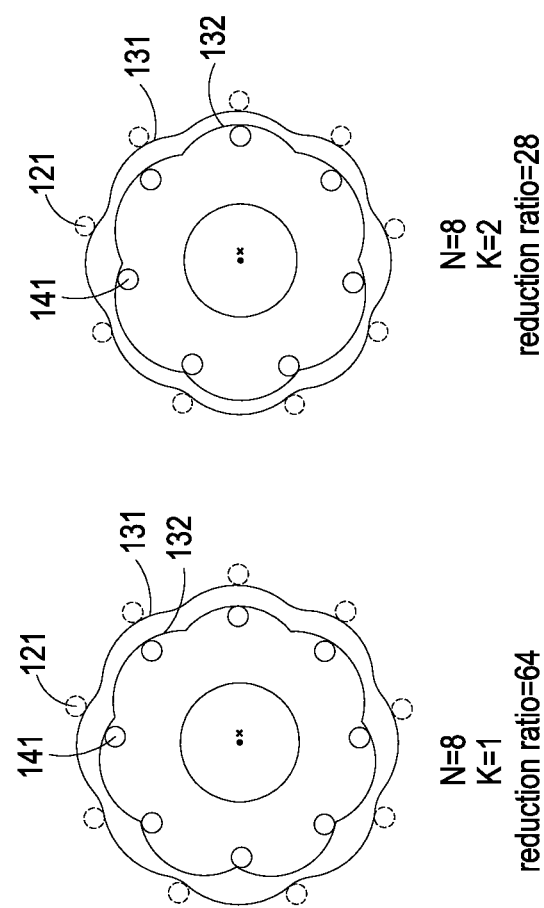
FIG. 13 schematically illustrates two examples of the speed reducer of the present invention in the first operating situation, in which N=8 (K=1, 2)
Figure 14:
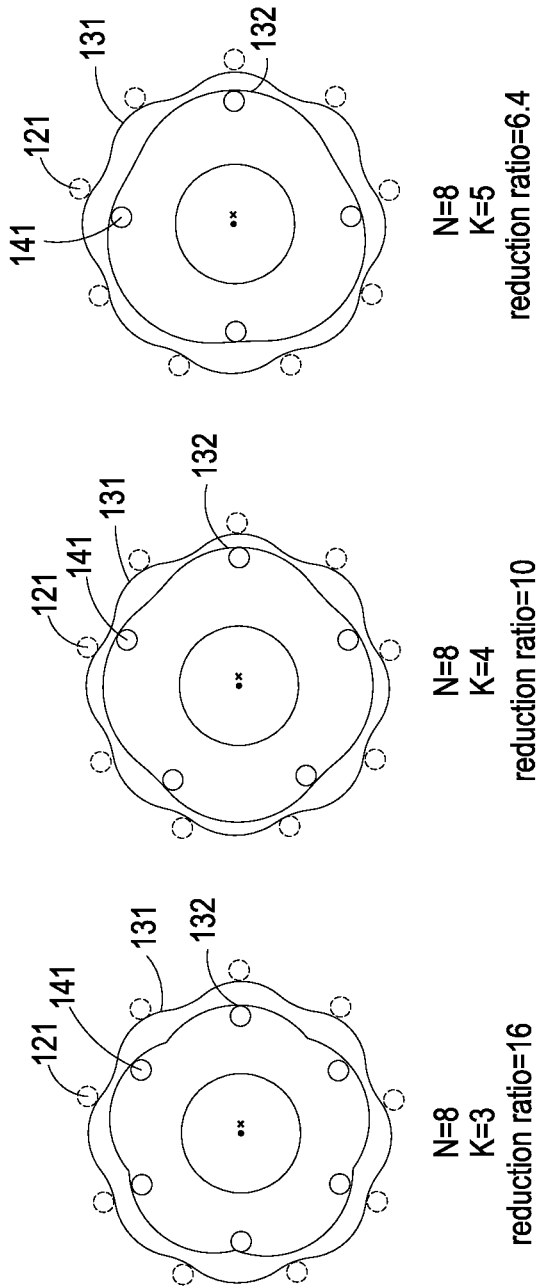
FIG. 14 schematically illustrates three examples of the speed reducer of the present invention in the first operating situation, in which N=8 (K=3, 4, 5)

FIG. 13 schematically illustrates two examples of the speed reducer of the present invention in the first operating situation, in which N=8 (K=1, 2). If the number N of the outer teeth is 8 and the number difference between the outer teeth and the inner teeth is 1 (i.e., K=1), the reduction ratio of the speed reducer 1 is equal to 8×(8−1+1)/1=64. If the number N of the outer teeth is 8 and the number difference between the outer teeth and the inner teeth is 2 (i.e., K=2), the reduction ratio of the speed reducer 1 is equal to 8×(8−2+1)/2=28. FIG. 14 schematically illustrates three examples of the speed reducer of the present invention in the first operating situation, in which N=8 (K=3, 4, 5). If the number N of the outer teeth is 8 and the number difference between the outer teeth and the inner teeth is 3 (i.e., K=3), the reduction ratio of the speed reducer 1 is equal to 8×(8−3+1)/3=16. If the number N of the outer teeth is 8 and the number difference between the outer teeth and the inner teeth is 4 (i.e., K=4), the reduction ratio of the speed reducer 1 is equal to 8×(8−4+1)/4=10. If the number N of the outer teeth is 8 and the number difference between the outer teeth and the inner teeth is 5 (i.e., K=5), the reduction ratio of the speed reducer 1 is equal to 8×(8−5+1)/5=6.4.

In the third operating situation of the speed reducer 1, the following presuppositions are made: the plural first rollers 121 are not rotated about the fixed positions of the mounting surface 122, the plural second rollers 141 are rotated about the fixed positions of the third surface 1400 of the second wheel disc 140, and the number of the outer teeth of the convex structure 131 minus the number of the inner teeth of the concave structure 132 is equal to K, wherein K is negative. Under this circumstance, the rotating direction of the first transmission shaft 10 and the rotating direction of the second transmission shaft 15 are different. In case that the number of the outer teeth of the convex structure 131 is N, the reduction ratio is equal to $|N*(N-K+1)/K|$, wherein N is an integer greater than 1 and the difference (N−K) is greater than 1.

Figure 15:
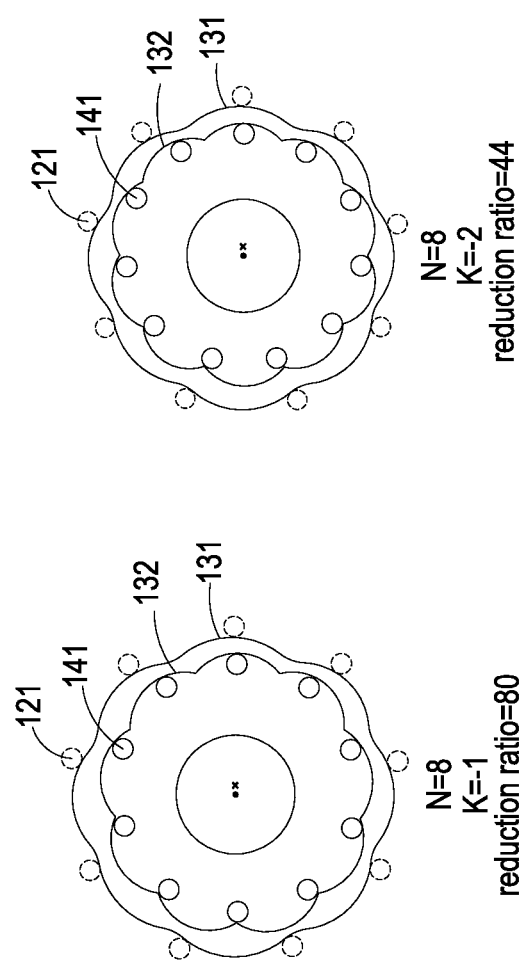
FIG. 15 schematically illustrates two examples of the speed reducer of the present invention in the third operating situation, in which N=8 (K=−1, −2)
Figure 16:
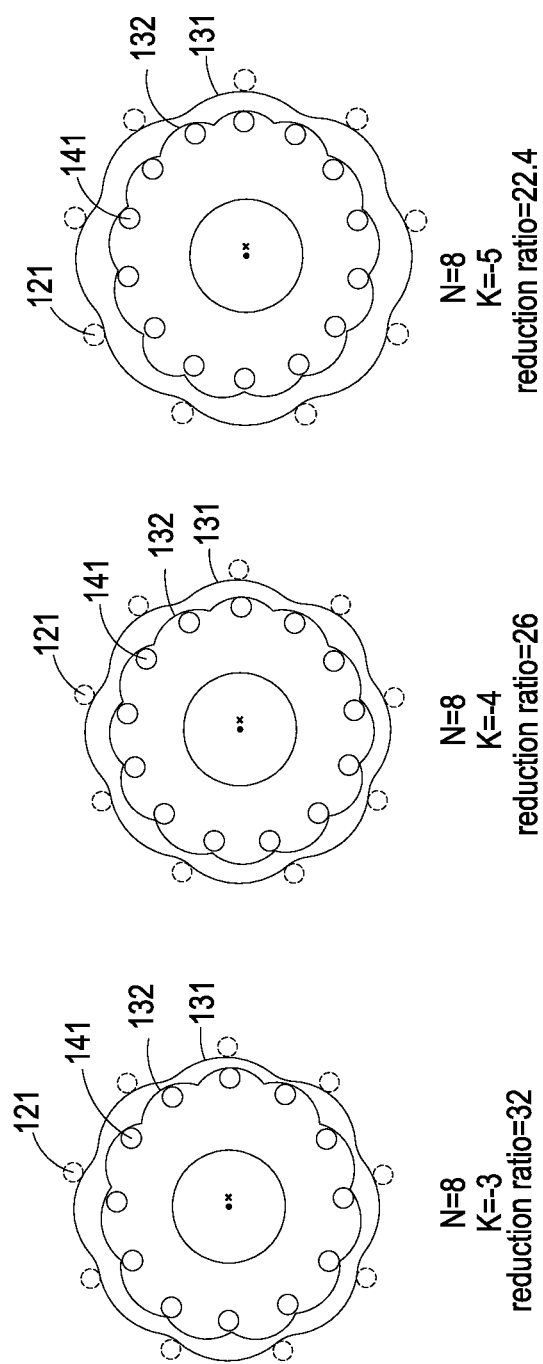
FIG. 16 schematically illustrates three examples of the speed reducer of the present invention in the third operating situation, in which N=8 (K=−3, −4, −5)

FIG. 15 schematically illustrates two examples of the speed reducer of the present invention in the third operating situation, in which N=8 (K=−1, −2). If the number N of the outer teeth is 8 and the number difference between the outer teeth and the inner teeth is −1 (i.e., K=−1), the reduction ratio of the speed reducer 1 is equal to $8\times(8+1+1)/(-1)=80$. If the number N of the outer teeth is 8 and the number difference between the outer teeth and the inner teeth is −2 (i.e., K=−2), the reduction ratio of the speed reducer 1 is equal to $|8\times(8+2+1)/(-2)|=44$. FIG. 16 schematically illustrates three examples of the speed reducer of the present invention in the third operating situation, in which N=8 (K=−3, −4, −5). If the number N of the outer teeth is 8 and the number difference between the outer teeth and the inner teeth is −3 (i.e., K=−3), the reduction ratio of the speed reducer 1 is equal to $8\times(8+3+1)/(-3)=32$. If the number N of the outer teeth is 8 and the number difference between the outer teeth and the inner teeth is −4 (i.e., K=−4), the reduction ratio of the speed reducer 1 is equal to $8\times(8+4+1)/(-4)=26$. If the number N of the outer teeth is 8 and the number difference between the outer teeth and the inner teeth is −5 (i.e., K=−5), the reduction ratio of the speed reducer 1 is equal to $8\times(8+5+1)/(-5)=22.4$.

In the first operating situation or the third operating situation of the speed reducer 1, the reduction ratio is equal to $|N\times(N-K+1)/K|$, wherein N is an integer greater than 1. Since the number of the outer teeth of the convex structure 131 and the number of the inner teeth of the concave structure 132 are different, K is an integer that is not equal to 0. Moreover, the number difference (N−K) is greater than 1. In case that the term $N\times(N-K+1)/K$ is positive, the rotating direction of the first transmission shaft 10 and the rotating direction of the second transmission shaft 15 are identical. Whereas, in case that the term $N\times(N-K+1)/K$ is negative, the rotating direction of the first transmission shaft 10 and the rotating direction of the second transmission shaft 15 are different.

In the second operating situation of the speed reducer 1, the following presuppositions are made: the plural first rollers 121 are rotated about the fixed positions of the mounting surface 122, the plural second rollers 141 are not rotated about the fixed positions of the third surface 1400 of the second wheel disc 140, and the number of the outer teeth of the convex structure 131 minus the number of the inner teeth of the concave structure 132 is K. Under this circumstance, the rotating direction of the first transmission shaft 10 and the rotating direction of the second transmission shaft 15 are different. In case that the number of the outer teeth of the convex structure 131 is N, the reduction ratio is equal to $|(N+1)\times(N-K)/K|$, wherein N is an integer greater than 1 and the difference (N−K) is greater than 1.

Figure 17:
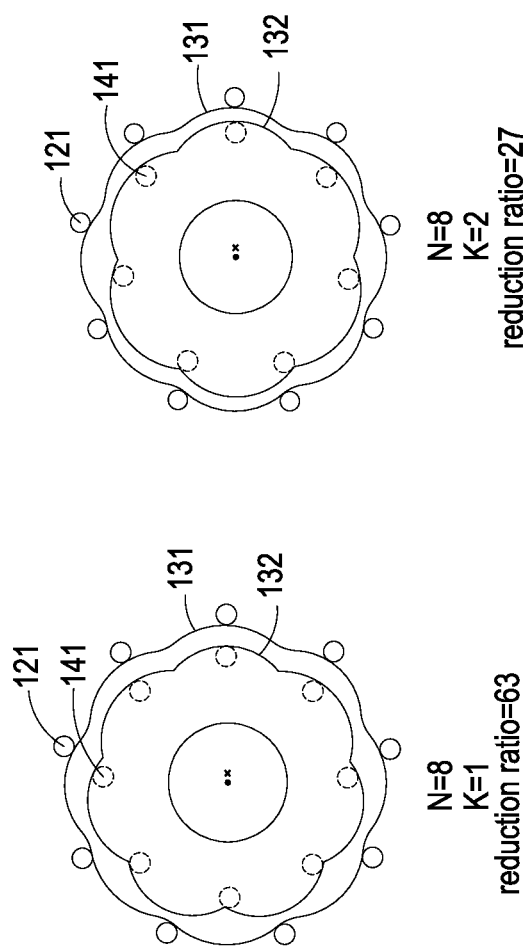
FIG. 17 schematically illustrates two examples of the speed reducer of the present invention in the second operating situation, in which N=8 (K=1, 2)
Figure 18:
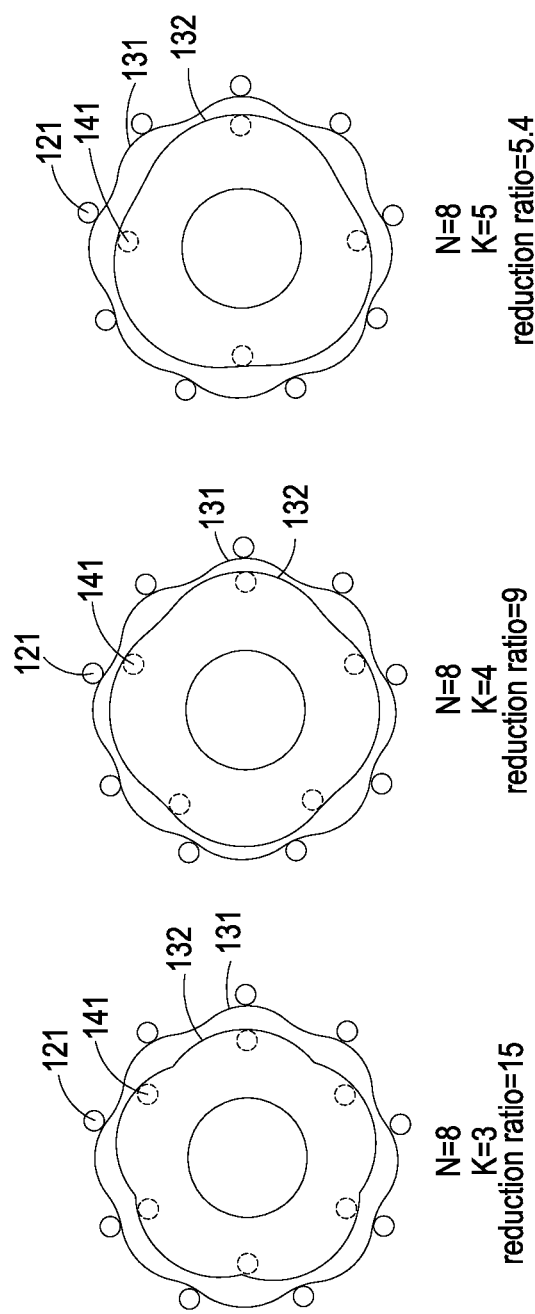
FIG. 18 schematically illustrates three examples of the speed reducer of the present invention in the second operating situation, in which N=8 (K=3, 4, 5)

FIG. 17 schematically illustrates two examples of the speed reducer of the present invention in the second operating situation, in which N=8 (K=1, 2). If the number N of the outer teeth is 8 and the number difference between the outer teeth and the inner teeth is 1 (i.e., K=1), the reduction ratio of the speed reducer 1 is equal to $(8+1)\times(8-1)/1=63$. If the number N of the outer teeth is 8 and the number difference between the outer teeth and the inner teeth is 2 (i.e., K=2), the reduction ratio of the speed reducer 1 is equal to $(8+1)\times(8-2)/2=27$. FIG. 18 schematically illustrates three examples of the speed reducer of the present invention in the second operating situation, in which N=8 (K=3, 4, 5). If the number N of the outer teeth is 8 and the number difference between the outer teeth and the inner teeth is 3 (i.e., K=3), the reduction ratio of the speed reducer 1 is equal to $(8+1)\times(8-3)/3=15$. If the number N of the outer teeth is 8 and the number difference between the outer teeth and the inner teeth is 4 (i.e., K=4), the reduction ratio of the speed reducer 1 is equal to $(8+1)\times(8-4)/4=9$. If the number N of the outer teeth is 8 and the number difference between the outer teeth and the inner teeth is 5 (i.e., K=5), the reduction ratio of the speed reducer 1 is equal to $(8+1)\times(8-5)/5=5.4$.

In the fourth operating situation of the speed reducer 1, the following presuppositions are made: the plural first rollers 121 are rotated about the fixed positions of the mounting surface 122, the plural second rollers 141 are not rotated about the fixed positions of the third surface 1400 of the second wheel disc 140, and the number of the outer teeth of the convex structure 131 minus the number of the inner teeth of the concave structure 132 is equal to K, wherein K is negative. Under this circumstance, the rotating direction of the first transmission shaft 10 and the rotating direction of the second transmission shaft 15 are identical. In case that the number of the outer teeth of the convex structure 131 is N, the reduction ratio is equal to $|(N+1)\times(N-K)/K|$, wherein N is an integer greater than 1 and the difference (N−K) is greater than 1.

Figure 19:
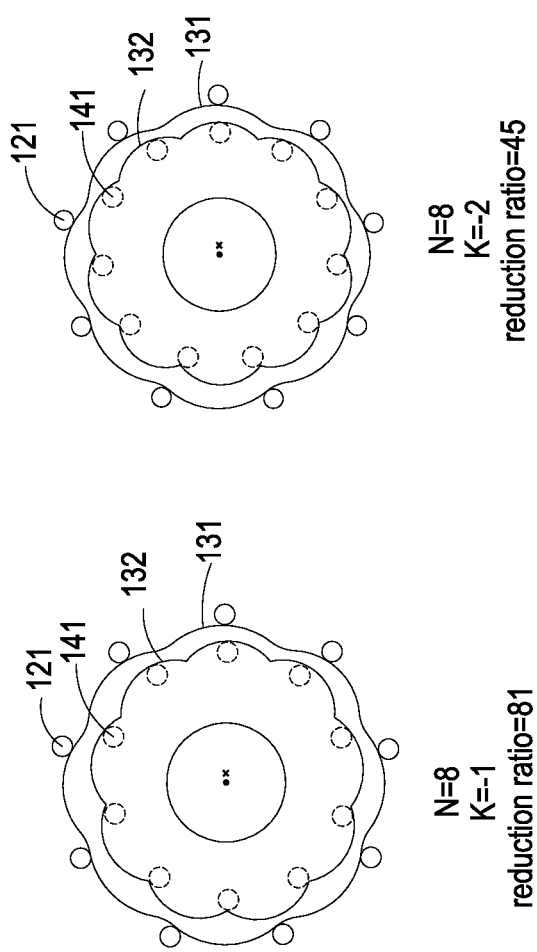
FIG. 19 schematically illustrates two examples of the speed reducer of the present invention in the fourth operating situation, in which N=8 (K=−1, −2)
Figure 20:
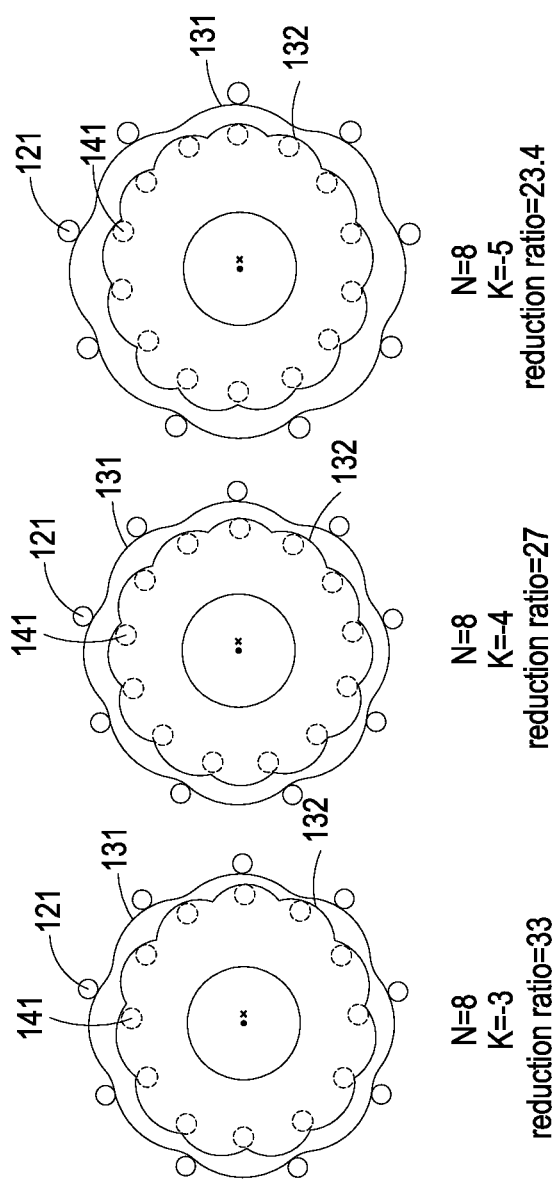
FIG. 20 schematically illustrates three examples of the speed reducer of the present invention in the fourth operating situation, in which N=8 (K=−3, −4, −5).

FIG. 19 schematically illustrates two examples of the speed reducer of the present invention in the fourth operating situation, in which N=8 (K=−1, −2). If the number N of the outer teeth is 8 and the number difference between the outer teeth and the inner teeth is −1 (i.e., K=−1), the reduction ratio of the speed reducer 1 is equal to $|(8+1)\times(8+1)/(-1)|=81$. If the number N of the outer teeth is 8 and the number difference between the outer teeth and the inner teeth is −2 (i.e., K=−2), the reduction ratio of the speed reducer 1 is equal to $|(8+1)\times(8+2)/(-2)|=45$. FIG. 20 schematically illustrates three examples of the speed reducer of the present invention in the fourth operating situation, in which N=8 (K=−3, −4, −5). If the number N of the outer teeth is 8 and the number difference between the outer teeth and the inner teeth is −3 (i.e., K=−3), the reduction ratio of the speed reducer 1 is equal to $|(8+1)\times(8+2)/(-3)|=33$. If the number N of the outer teeth is 8 and the number difference between the outer teeth and the inner teeth is −4 (i.e., K=−4), the reduction ratio of the speed reducer 1 is equal to $(8+1)\times(8+2)/(-4)=27$. If the number N of the outer teeth is 8 and the number difference between the outer teeth and the inner teeth is −5 (i.e., K=−5), the reduction ratio of the speed reducer 1 is equal to $|(8+1)\times(8+2)/(-5)\|=23.4$.

In the second operating situation or the fourth operating situation of the speed reducer 1, the reduction ratio is equal to $|(N+1)\times(N-K)/K|$, wherein N is an integer greater than 1. Since the number of the outer teeth of the convex structure 131 and the number of the inner teeth of the concave structure 132, K is an integer that is not equal to 0. Moreover, the number difference (N−K) is greater than 1. In case that the term $(N+1)\times(N-K)/K$ is positive, the rotating direction of the first transmission shaft 10 and the rotating direction of the second transmission shaft 15 are different. Whereas, in case that the term $(N+1)\times(N-K)/K$ is negative, the rotating direction of the first transmission shaft 10 and the rotating direction of the second transmission shaft 15 are identical.

In some embodiments, the eccentric wheel 11 and the second transmission shaft 15 are connected with each other through a coupling (not shown). Moreover, the wall region between the concave structure 132 and the convex structure 131 may have cavities. Due to the cavities, the dynamic balance of the rotating wheel 13 during rotation can be achieved. Moreover, the dynamic balance of the speed reducer may be achieved by adjusting the weight of the first transmission shaft 10 or providing an eccentric design of the rotating wheel 13.

In the above embodiment, the first transmission shaft 10 is the power input end, and the second transmission shaft 15 is the power output end. It is noted that those skilled in the art will readily observe that numerous modifications and alterations may be made while retaining the teachings of the invention. For example, in another embodiment, the first transmission shaft 10 is the power output end, and the second transmission shaft 15 is the power input end. Under this circumstance, the speed reducer 1 is a speed increaser in fact.

From the above descriptions, the present invention provides a speed reducer. The speed reducer comprises a rotating wheel, a first roller assembly and a second roller assembly. The rotating wheel comprises a convex structure and a concave structure. The convex structure is contacted with plural first rollers of the first roller assembly. The concave structure is contacted with plural second rollers of the second roller assembly. The pushing action of the speed reducer of the present invention is similar to the conventional harmonic drive reducer. Consequently, the speed reducer of the present invention has simplified structure and less number of components, and is easily assembled and cost-effective. Moreover, due to the concave structure of the rotating wheel, the volume and weight of the overall speed reducer are reduced. Moreover, since the wall region of the rotating wheel is clamped by the plural first rollers and the plural second rollers, the gaps between the rotating wheel and the plural first rollers and the plural second rollers can be effectively controlled. Moreover, due to the wall region, the overall rigidity of the speed reducer is increased to withstand high impact, and the use life of the speed reducer is prolonged. Moreover, since the speed reducer of the present invention is designed to have four operating situations, the speed reducer can have various reduction ratios. That is, the speed reducer of the present invention can provide a high reduction ratio. In conclusion, the speed reducer of the present invention has the benefits of a RV reducer and a harmonic drive reducer.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A speed reducer, comprising:
   a first transmission shaft having a first end and a second end;
   an eccentric wheel eccentrically fixed on the second end of the first transmission shaft;
   a first roller assembly comprising a first wheel disc and plural first rollers, wherein the first wheel disc is arranged between the first end and the second end of the first transmission shaft, the plural first rollers are disposed on the first wheel disc, and the plural first rollers are selectively self-rotated;
   a rotating wheel comprising a main body and an axle hole, wherein the eccentric wheel is rotatably disposed within the axle hole, and the main body comprises a convex structure and a concave structure, wherein the convex structure is protruded from an outer periphery of the main body and has one or plural outer teeth, and the outer periphery of the main body is contacted with the corresponding first rollers, wherein the concave structure is concavely formed in a surface of the main body and comprises one or plural inner teeth;
   a second roller assembly comprising a second wheel disc and plural second rollers, wherein the plural second rollers are disposed on the second wheel disc, the plural second rollers are selectively self-rotated, and the second rollers are contacted with the corresponding inner teeth; and
   a second transmission shaft having a third end and a fourth end, wherein the second wheel disc is fixed on the third end of the second transmission shaft,
   wherein the number of the outer teeth and the number of the inner teeth are different, the number of the first rollers is at least one more than the number of the outer teeth, and the number of the second rollers is at least one more than the number of the inner teeth.

2. The speed reducer according to claim 1, wherein the plural first rollers are not self-rotated, and the second rollers are self-rotated.

3. The speed reducer according to claim 2, wherein if the number of the outer teeth minus the number of the inner teeth is K, a reduction ratio of the speed reducer is equal to $|N \times (N-K+1)/K|$, wherein N is the number of the outer teeth, and N is an integer greater than 1, wherein K is an integer not equal to 0, and (N−K) is greater than 1.

4. The speed reducer according to claim 3, wherein if K is positive, a rotating direction of the first transmission shaft and a rotating direction of the second transmission shaft are identical.

5. The speed reducer according to claim 3, wherein if K is negative, a rotating direction of the first transmission shaft and a rotating direction of the second transmission shaft are different.

6. The speed reducer according to claim 1, wherein the plural first rollers are self-rotated, and the second rollers are not self-rotated.

7. The speed reducer according to claim 6, wherein if the number of the outer teeth minus the number of the inner teeth is K, a reduction ratio of the speed reducer is equal to $|(N+1) \times (N-K)/K|$, wherein N is the number of the outer teeth, and N is an integer greater than 1, wherein K is an integer not equal to 0, and (N−K) is greater than 1.

8. The speed reducer according to claim 7, wherein if K is positive, a rotating direction of the first transmission shaft and a rotating direction of the second transmission shaft are different.

9. The speed reducer according to claim 7, wherein if K is negative, a rotating direction of the first transmission shaft and a rotating direction of the second transmission shaft are identical.

10. The speed reducer according to claim 1, wherein the first transmission shaft is a power input end, and the second transmission shaft is a power output end.

11. The speed reducer according to claim 1, wherein the speed reducer further comprises a bearing, wherein the bearing is disposed within the axle hole, and the bearing is combined with the eccentric wheel.

* * * * *